United States Patent Office 2,846,764
Patented Aug. 12, 1958

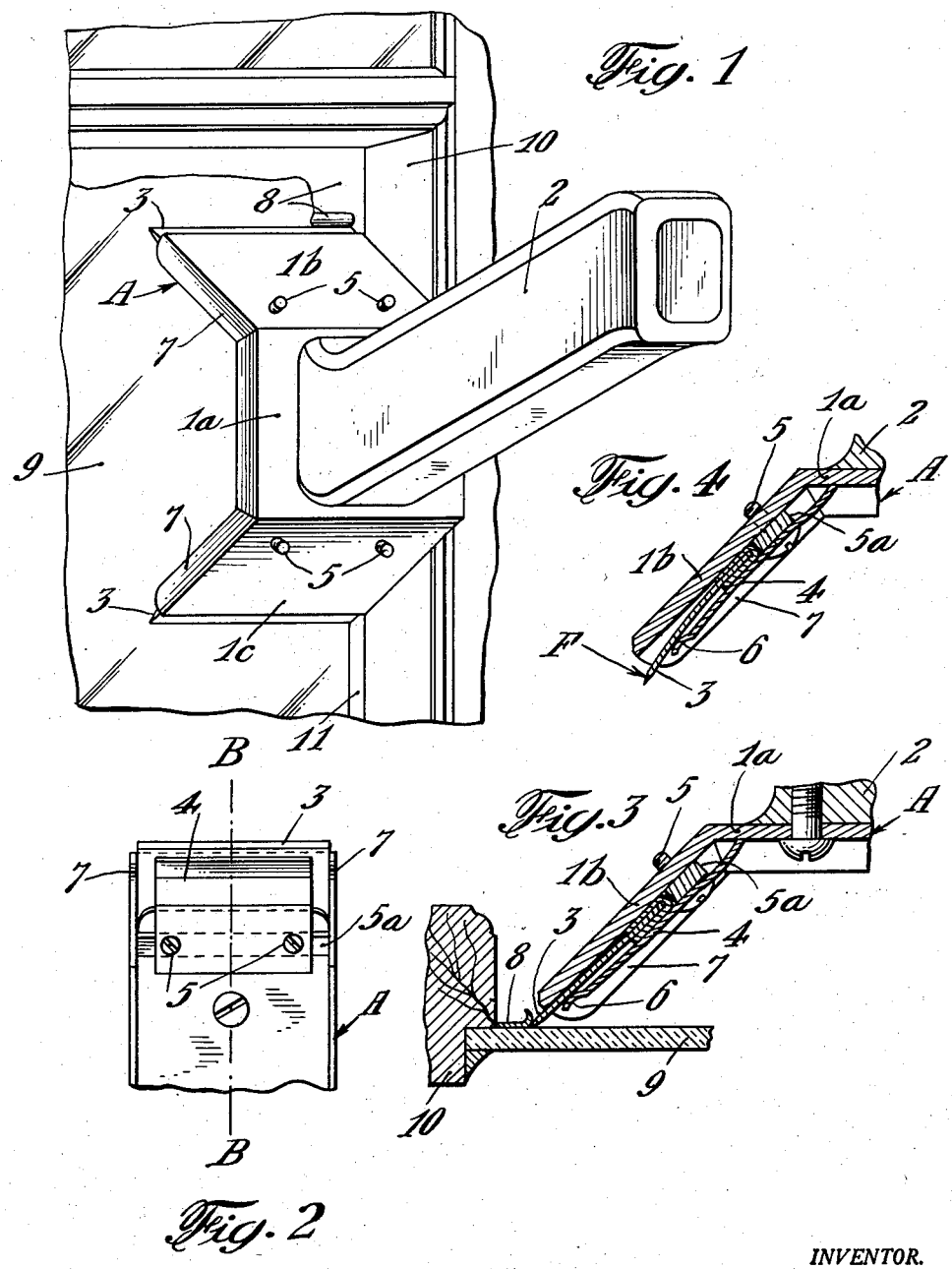

2,846,764

SCRAPING DEVICES

John R. Hyneman, Chatham, N. J.

Application January 6, 1956, Serial No. 557,746

1 Claim. (Cl. 30—172)

My invention relates to the field of scraping devices and particularly to the type of scraping devices that are intended for removing strongly adherent substances such as paint, paste, glue, ice or the like from smooth surfaces such as are provided by glass, ceramics or polished metal.

An important object of the invention is to provide a scraping device which will be particularly effective in lifting and removing strongly adherent unwanted material from glass, ceramic and other similar surfaces rapidly, efficiently and without damage to adjacent boundary framing surfaces.

Another object is to utilize in a scraper device sharp and hard but somewhat flexible and long wearing blades of a standard, readily obtainable and inexpensive type which may be easily sharpened if desired or may be discarded and replaced at negligible expense.

Another object is to provide a scraper light in weight and with a cutting edge sufficiently flexible to follow undulations in the scraped surface but mounted so as to withstand breakage of the blade despite the substantial propelling force necessary to force the blade through the highly resistant bond between the unwanted material and the surface to be cleared.

A further object is to provide a scraper which will permit rapid and firm back and forth motion with equal effectiveness on both strokes thus permitting marked reductions in time and labor.

An additional object of the invention is to include in a scraping device guiding or spacing elements which will space the boundary of the scraped path at a prescribed safe distance from the adjacent bounding members or structures such as are found on windows or automobile windshields or the like, thus avoiding damage to the bounding surfaces and to the paint fillet which is usually desired at the junction of the two surfaces.

Still another object is to so mount thin and somewhat flexible blades in a scraping device intended to be used with firm and vigorous strokes that inadvertent encounter with firm obstacles within or alongside the scraping path is largely avoided and in the event of such encounter the blade will flex harmlessly without breaking.

With the foregoing and other objects in mind, I have devised and extensively tested a scraping tool which comprises basically, as will be described in detail later, a supporting member designed to hold two scraping blades in opposed forward and backward scraping positions, movable under forceful propulsion by a full hand grip applied through a large and substantial handle firmly affixed to the supporting member. Although other designs of blades and handle may be employed, in the interest of effectiveness, economy and convenience my preferred design utilizes ordinary single edge razor blades for the scraping edges while the tool is propelled by a handle of the same general character as those fitted to carpenter's planes. A handle of this size and configuration permits a firm and forceful, yet comfortable grip not heretofore used in a light tool and equally effective whether used on vertical, horizontal or otherwise oriented surfaces.

The design of the entire device is such as to take advantage of the substantial pressure that may be exerted by the full hand grip handle upon the blades operating in effective back and forth motion, while at the same time protecting from breakage the thin, sharp and flexible, and hence singularly effective scraping blades. Without the protective expedients utilized these somewhat fragile blades are particularly subject to breakage when used in service of this kind. Properly dimensioned and oriented side extensions of the main support member space the scraper blades at a suitable distance from the support framework of the surface being scraped as a means of preventing breakage of the corners of the blades and damage to the support framework. Also, because of these extensions the small paint fillet usually desired at the junction of the surface and framework is left undisturbed during scraping. The blades are further protected against breakage by the employment of a novel yielding rather than a rigid form of support so that sharp bending and hence overstressing of the blade at any one point does not ordinarily occur.

In the drawings, in which like reference numbers designate the same part in the different figures:

Figure 1 represents a general view of one embodiment of the invention in approximate actual size resting in scraping position on a pane of window glass, Figure 2 is a view of the underside of one end of the scraper as at A in Figure 1, the other end being identical, Figure 3 represents a cross section of one end of the scraper as found along the line B—B of Figure 2 drawn to a larger scale and, Figure 4, also in larger scale, illustrates how novel blade mounting aids the blade to resist breakage when obstacles are inadvertently encountered during normal operation.

It should be understood that many modifications of the various features of the device are possible which are capable of realizing in more or less degree the unique advantages of the invention, and while the drawings illustrate one satisfactory form of the invention, the principles defined in the claims will encompass many variations which will occur to persons skilled in the production of such devices.

Referring now in detail to the drawings, which illustrate one embodiment of the invention, there is shown in the overall view of Figure 1 a base member or blade support of channel cross section comprising a central section 1a which is preferably only long enough to accommodate the base of the handle 2, and two opposite end sections 1b and 1c respectively bent alike at an angle of about 45° to 50° to the central 1a portion, and therefore bearing this same angle to the scraped surface. The two end sections serve as support, guide and protector for the two blades 3 which are mounted on the under sides as shown in greater detail in Figures 2 and 3. The blades 3 are preferably of the general type known as single edge safety razor blades since their hard and sharp edges combined with a degree of flexibility suit them ideally for penetrating the bond which is ordinarily formed by paint, paste, varnish, glue and similar adherent materials with glass, ceramic and other like surfaces. I have found that these blades, while thin, still are sufficiently strong to give long service when used with moderate care in this novel protective design of support, as will hereinafter appear.

The relatively large angle with the scraped surface of 45° to 50° I have found preferable in a tool intended for removing very hard and strongly adherent materials from hard surfaces. A smaller or a larger angle tends to allow the cutting edge to ride over the material unless a very considerable pressure is applied. For less resistant materials and relatively soft scraped surfaces a more acute angle is satisfactory. A special feature of the device resides in the fact that since both edges rest on the scraped surface the scraping angle presented by the blades is maintained continuously at the most effective value, and this would continue to be the case even if one of the blades was omitted and that end of the scraper was allowed to ride directly on the scraped surface.

One suitable though simple method for holding the blades in place is by means of slightly flexible retaining strips 4 bent to the general contour as indicated in Figure 3 and held in place by two machine screws 5 so that with the abutting strip 5a, also held in place by the two machine screws, or with studs or other equivalent projection to bear the backward thrust, the blade is held immovable through the normal scraping stroke during which the blade is held firmly against the scraped surface. But should a bending moment be applied to the blade as by striking a fixed obstacle due to inadvertence or careless handling, as illustrated, for example, in Figure 4 then the blade is allowed to bend as a whole or in an arc of wide radius thus avoiding overstressing of the metal at any particular small area, as would occur if the bending arc had a small radius.

The lower edge of the retaining strips 4 may be bent downward slightly to allow convenient insertion of replacement blades without the necessity of loosening the screws.

This mode of support has particular advantage in one tedious and difficult variety of work for which my invention is uniquely adapted. The painting of windows usually leaves a strip of unwanted paint on the glass pane alongside the frame and muntin members which must be subsequently removed. When scraping alongside these members an operator may depart from a precise back and forth motion and inadvertently allow a corner of the blade to engage or gouge a support member, and inasmuch as the design of scraper permits considerable force to be applied, a rigidly held blade will sometimes break. This follows because the blade is bent so sharply as to overstress the metal at the point or line of support so that the highly tempered metal readily snaps. However if the support under the edge of the blade as at 6 in Figures 3 and 4 is yielding in nature, the support will bend with the blade thus not only absorbing a major share of the force of the blow but at the same time allowing the blade to bend over its entire length from cutting edge to base, thus tending to avoid overstressing the blade at any one point as would occur when a force F was encountered at the cutting edge, if the blade were gripped rigidly at 6.

For the multiple purpose of protecting the blades against encounter with obstacles which could cause blade breakage or damage to mounting structures, and of spacing the edge of the scraped path at such a distance from the pane support members that a slight fillet of paint remains, the sides 7 of the scrapper support member are bent downward at right angles so as to more or less sheathe the corners of the blades. These projections should be smoothly polished to reduce friction and to avoid damage to painted or polished side surfaces. The cutting edge of the blades should protrude beyond the forward edges of the support member no farther than is necessary, say, $\frac{1}{16}$ to $\frac{1}{8}$ inch.

Illustrative of the functioning of the device there is shown at 8 in Figure 1 an unwanted strip of paint remaining on the glass pane 9 after painting the window boundary member 10. Such deposits are readily removed by the scraper of the invention by the exercise of a few back and forth strokes while leaving a desirable narrow paint fillet 11 and without damage to the member 10.

In the embodiment of the scraper illustrated the support member 1 is formed of strap metal of about $\frac{1}{16}$ inch thickness formed in such shape as to embrace the desirable features indicated. Also the method of mounting the blades is a simple arrangement possessing the unique advantages described. The general assembly can be manufactured inexpensively, and, in service, worn or broken blades can be easily replaced by readily obtainable and inexpensive new ones. This support member, including the protective side extensions, could also be moulded of cast metal or plastic, as could the handle.

As is evident in Figures 1 and 3 the active material removing blade at any instant in the course of the back and forth strokes is the leading blade while the trailing blade maintains the alignment of the tool. On the reverse stroke the function of the two blades is reversed. It is the leading blade which is subjected to the breaking stresses upon encounter with very strongly adherent material on the work surface or by accidental engagement of the corners of the blade with work surface boundary members. Relief from these stresses is provided by my novel construction.

The general embodiment of the invention shown possesses in combination the several unique advantages previously set forth in this specification to provide a singularly effective tool. It is obvious that these advantages may be obtained by different but equivalent methods of construction, and that omissions of some features may be made with loss of the attendant advantages while retaining the remainder to provide a tool somewhat less effective but still within the scope of the invention as defined in the appended claim.

Having now described my invention, I claim:

A scraping device operable by firm back and forth scraping strokes to remove hard adherent materials from hard smooth work surfaces having boundary members, comprising, a support member having a central handle mounting section with a substantial hand grip handle mounted thereon and having two identical U-shaped end sections each with broad bases and with short sides extending perpendicularly downward from said bases and each of said end sections holding a thin slightly flexible scraping blade which when in operation extends downwardly to make an angle of approximately 45° with a work surface, said blades serving alternately as leading cutting blade and trailing aligning blade depending upon the direction of motion, flexible retaining means attached to said support member pressing said blades upward against said bases, said flexible retaining means and said downwardly extending sides in combination providing protection of said leading blade against breakage as a consequence of accidental engagement of said leading blade with said boundary frame members.

References Cited in the file of this patent

UNITED STATES PATENTS

| | | |
|---|---|---|
| 656,468 | Mullin | Aug. 21, 1900 |
| 693,518 | Hamilton | Feb. 18, 1902 |
| 821,525 | Nordquist | May 22, 1906 |
| 989,601 | Hecht | Apr. 18, 1911 |
| 1,327,155 | Gottschalk | Jan. 6, 1920 |
| 1,910,087 | Charlton | May 23, 1933 |
| 2,546,577 | Young | Mar. 27, 1951 |